United States Patent [19]
Ono

[11] Patent Number: 5,748,381
[45] Date of Patent: May 5, 1998

[54] REAL IMAGE TYPE ZOOM FINDER OPTICAL SYSTEM

[75] Inventor: Nobuaki Ono, Yokohama, Japan

[73] Assignee: Ricoh Company, Ltd., Tokyo, Japan

[21] Appl. No.: 535,869

[22] Filed: Sep. 28, 1995

[30] Foreign Application Priority Data

Oct. 20, 1994 [JP] Japan ................................. 6-281377

[51] Int. Cl.$^6$ ............................. G02B 15/14; G02B 25/00; G02B 3/00
[52] U.S. Cl. ......................... 359/647; 359/687; 359/646
[58] Field of Search ................................. 359/687, 644, 359/646, 647, 715

[56] References Cited

U.S. PATENT DOCUMENTS

| | | | |
|---|---|---|---|
| 5,136,427 | 8/1992 | Sugawara | 359/646 |
| 5,193,030 | 3/1993 | Nozaki et al. | 359/687 |
| 5,448,400 | 9/1995 | Kikuchi et al. | 359/422 |
| 5,489,965 | 2/1996 | Mukai et al. | 354/471 |

FOREIGN PATENT DOCUMENTS 5341187  12/1993  Japan .

*Primary Examiner*—David C. Nelms
*Assistant Examiner*—John P. Cornely
*Attorney, Agent, or Firm*—Oblon, Spivak, McClelland, Maier & Neustadt, P.C.

[57] ABSTRACT

A real image type zoom finder optical system is constructed by an objective optical system, an erect orthoscopic optical system and an eyepiece optical system sequentially arranged from an object side. The objective optical system is composed of first to fourth lens groups each constructed by a single lens. The erect orthoscopic image optical system is composed of two erect prisms. The eyepiece optical system is composed of one lens group. A front face of the second lens group is constructed by an aspherical surface such that the first, second, third and fourth lens groups respectively have positive, negative, positive and positive refracting powers. A real image formed by the objective optical system is focused and formed within the erect orthoscopic image optical system. A zooming operation is performed by moving the second lens group from the object side to an eyepiece side on an optical axis of the finder optical system. A change in diopter of a finder caused by this zooming operation is corrected by an axial movement of the fourth lens group.

3 Claims, 15 Drawing Sheets

WIDE ANGLE END

TELESCOPIC END

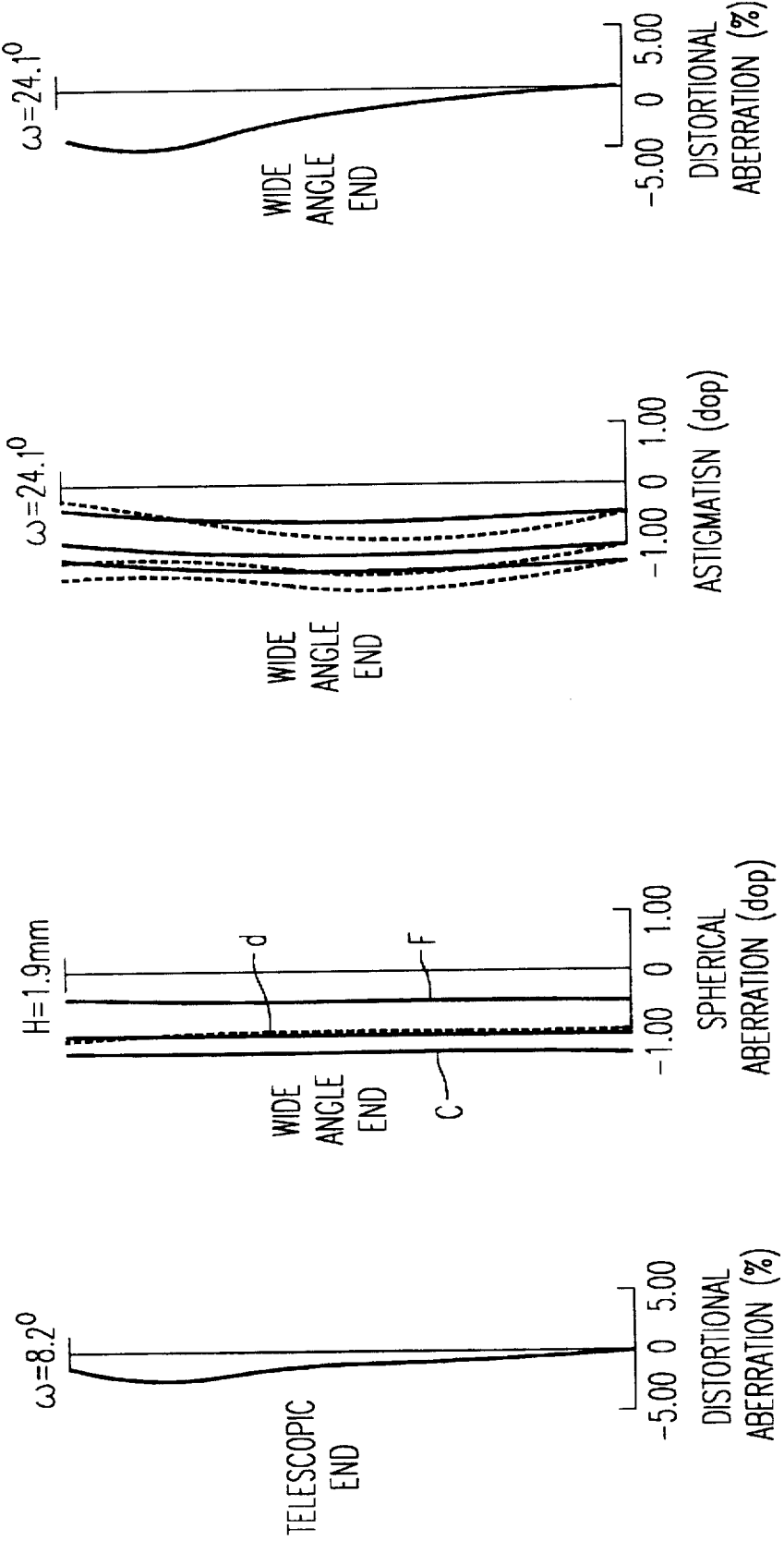

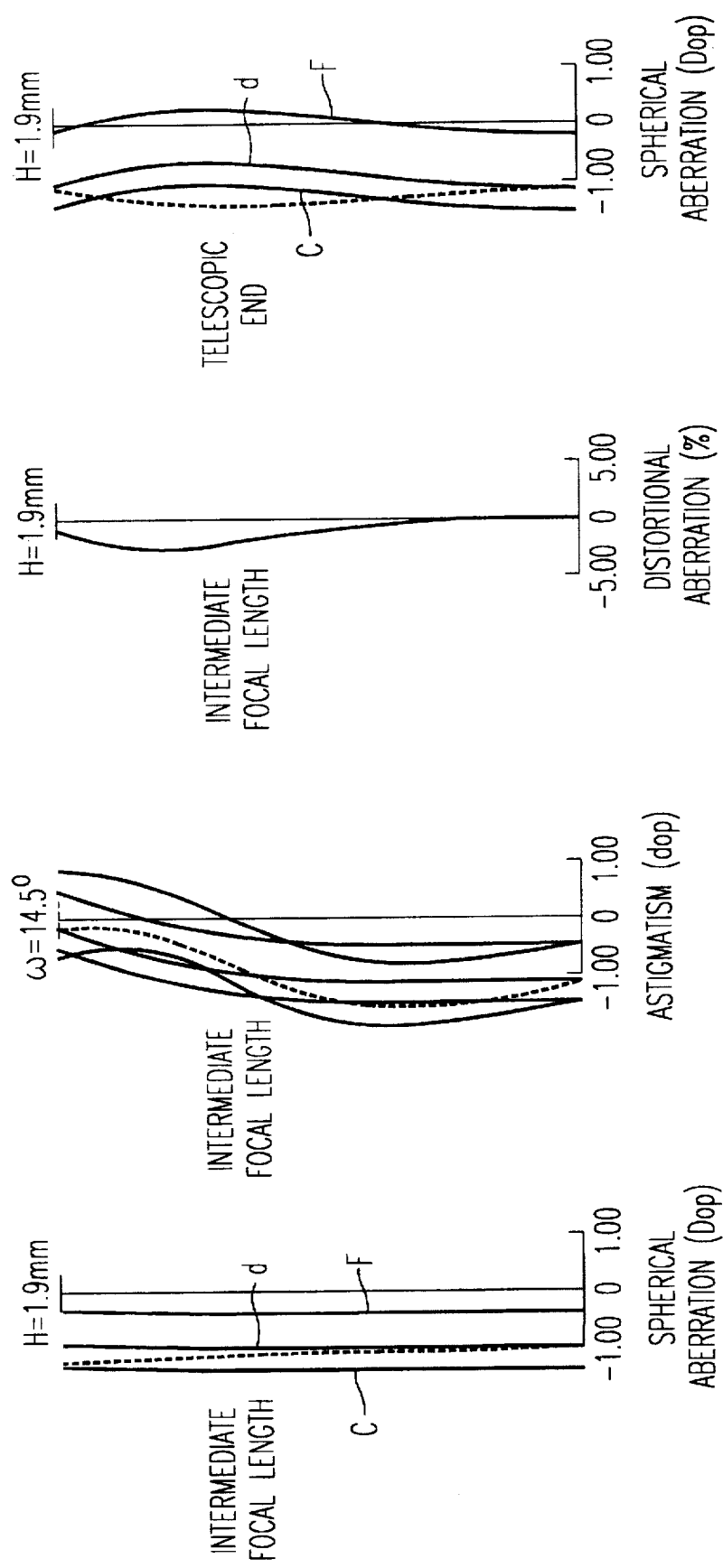

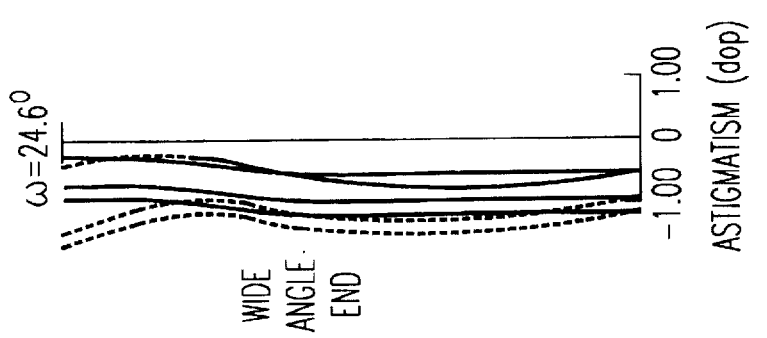
FIG. 26
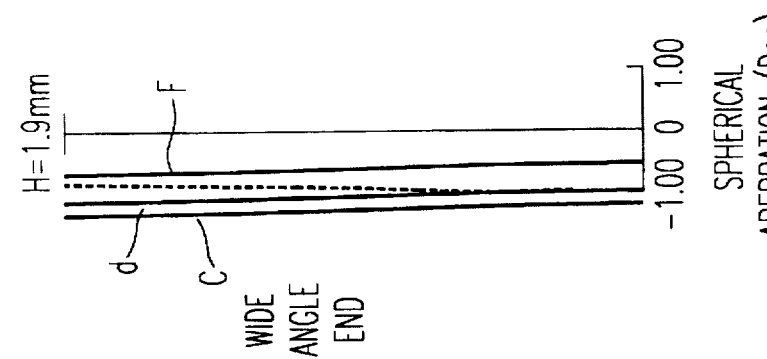
FIG. 25
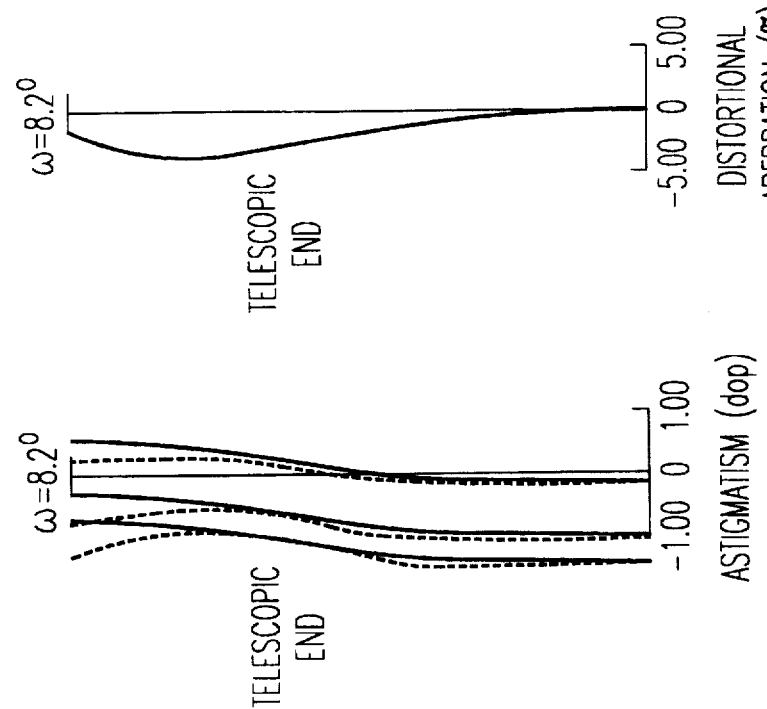
FIG. 24
FIG. 23

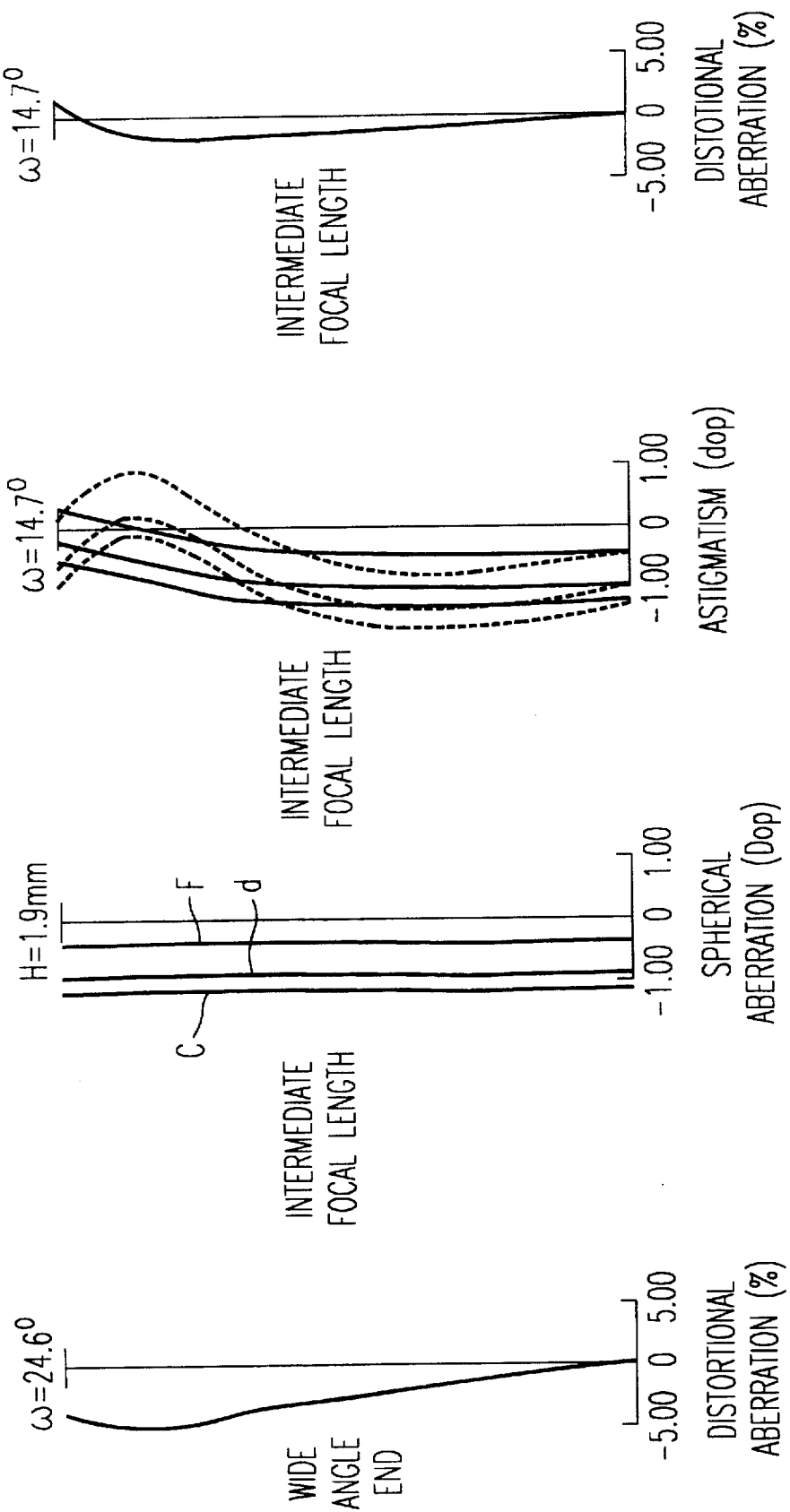

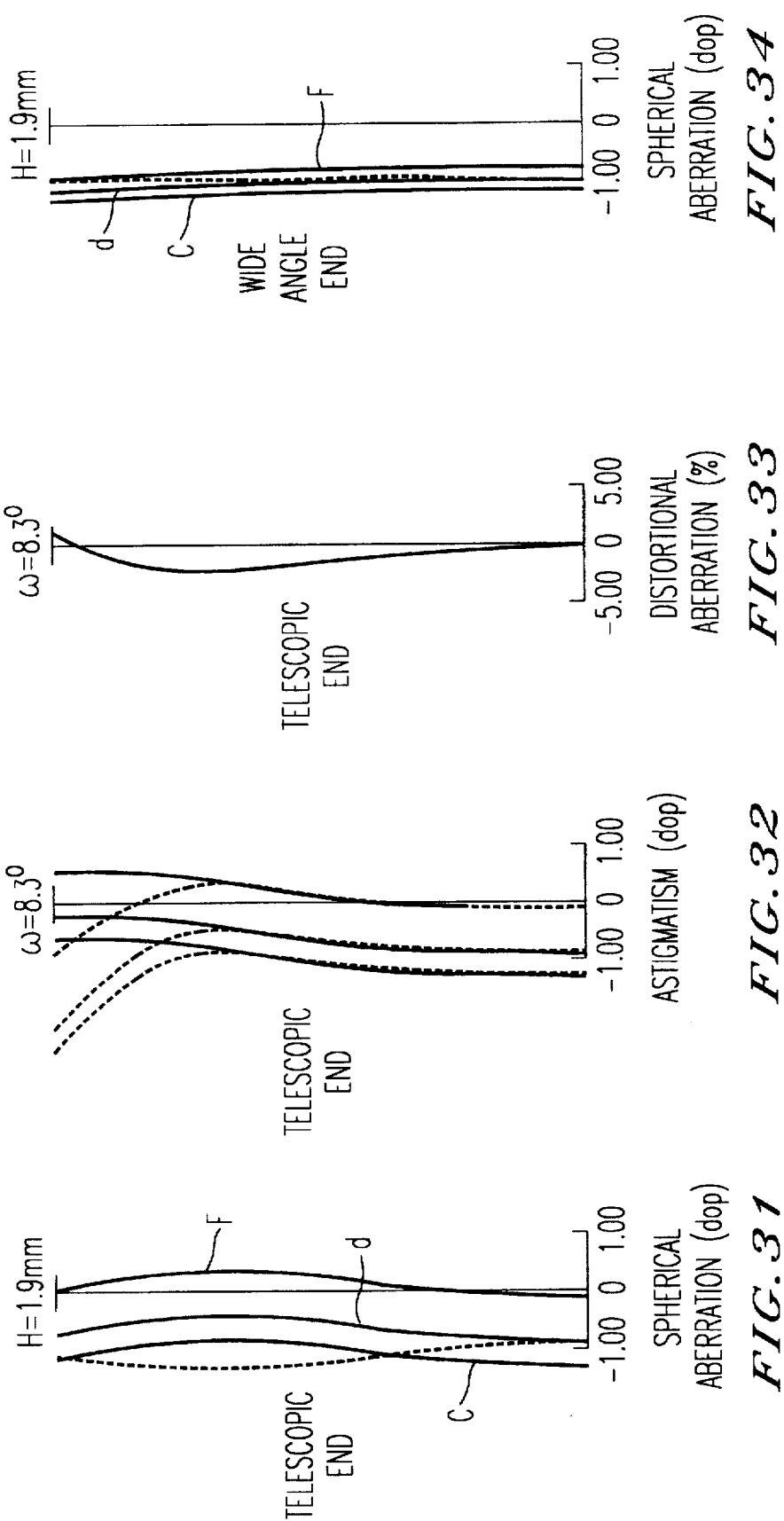

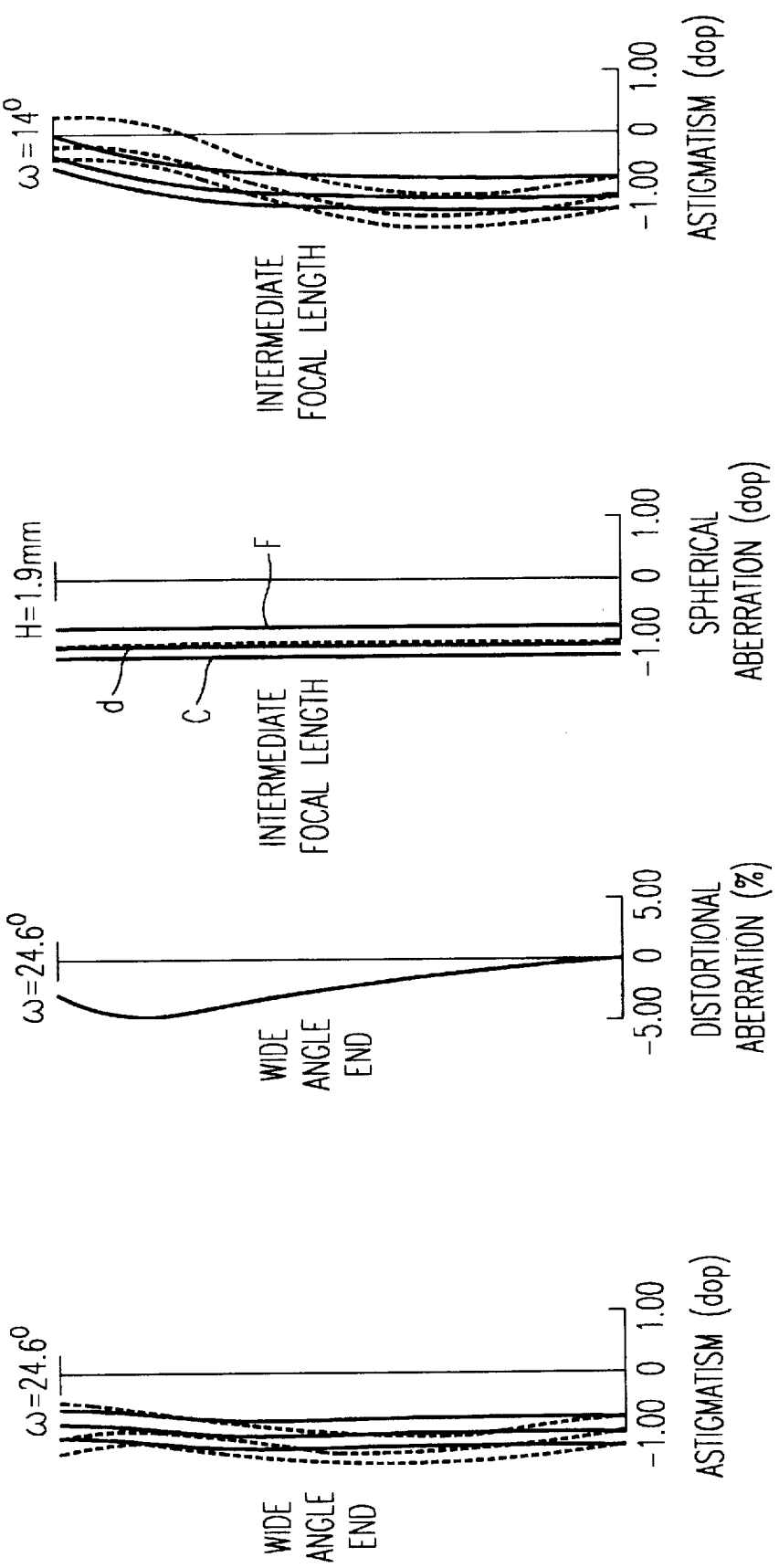

REAL IMAGE TYPE ZOOM FINDER OPTICAL SYSTEM

BACKGROUND OF THE INVENTION

1. Field of the Invention

The present invention relates to an improvement of a real image type zoom finder optical system usable in, for example, a 35 mm lens shutter camera, a video camera, an electronic still camera, etc.

2. Description of the Related Art

Recent user's requirements for improving performance of a compact camera such as a 35 mm lens shutter camera, etc. have been gradually escalated. These requirements include contents in which a varifocal photographing lens (zoom lens) is mounted onto the compact camera and a zoom ratio of the compact camera is further enlarged. Namely, the user's requirements have been escalated in a direction in which the compact camera approaches a high grade camera such as a single-lens reflex camera, etc.

A compact camera mounting a zoom lens having a large zoom ratio equal to or greater than 2.5 times has been realized to satisfy these requirements.

In contrast to this, a finder used in the compact camera is generally constructed by using an inverse Galileian finder for observing a virtual image formed by an objective optical system through an eyepiece optical system.

However, this inverse Galileian finder has a latent problem of extremely increasing a lens diameter so that no finder can be made compact when a zoom ratio of the finder is increased. Therefore, a Keplerian finder is recently used in the compact camera mounting a zoom lens having a large zoom ratio. In the Keplerian finder, a lens diameter can be held to be small even when the zoom ratio is set to be large although the entire length of a finder optical system is increased.

As is well known, a real image formed by an, objective optical system is observed through an eyepiece optical system in this Keplerian finder However, the thickness of a camera body tends to be increased in the compact camera mounting the zoom lens having a large zoom ratio. Accordingly, there is no great problem about the increase in entire length of the finder optical system even when the entire length of the finder optical system is increased to some degree and the Keplerian finder having this finder optical system is used. Therefore, the inventors of this patent application proposed a real image type zoom finder and a real image type zoom finder capable of changing magnification in official bulletin No. 1187.

This proposed real image type zoom finder is shown in each of FIGS. 1 and 2. In this zoom finder, an erect orthoscopic image optical system of G1 and G2 is arranged between an objective optical system of lens groups I to IV and an eyepiece optical system V. Each of the objective optical system and the eyepiece optical system has positive refracting power. The objective optical system of lens groups I to IV is constructed by four lens groups composed of a first positive lens group I, a second negative lens group II, a third positive lens group III and a fourth positive lens group IV sequentially arranged from an object side.

A real image is formed by the objective optical system I to IV within the erect orthoscopic image optical system of G1 and G2. The second lens group II is moved from the object side to an eyepiece side on an optical axis of the zoom finder so that magnification of the zoom finder is increased. A change in diopter caused by this increase in magnification is corrected by an axial movement of the fourth lens group IV.

In this case, the second lens group is constructed by two lenses and each of the other lens groups is constructed by a single lens in an embodiment. Further, a visual field frame is arranged within the erect orthoscopic image optical system.

This real image type zoom finder is shown in Japanese Patent Application Laying Open (KOKAI) No. 5-341187 and is compact and fulfills a preferable optical performance so that predetermined objects of the zoom finder are sufficiently achieved.

Basic propositions with respect to the compact camera are compactness and low cost. Accordingly, achievement of these basic propositions is required at any time in development and offer of the real image type zoom finder optical system.

In contrast to this, user's requirements with respect to the compact camera are not necessarily limited to only a field of the photographing lens. For example, the user's requirements include contents in many fields in which a screen size can be changed from a normal full size to a panoramic size and various kinds of data at a photographing time can be displayed within a visual field of the finder.

Accordingly, the construction of the real image type zoom finder described in the above Japanese Patent Application Laying Open (KOKAI) No. 5-341187 and constructed by four lens groups of five lenses must be further simplified to satisfy the user's requirements in many fields while the camera is more compact and cost of the camera is reduced. Further, it is necessary to develop a real image type zoom finder optical system such that a visual field range of the finder constructed as a normal visual field frame in the general technique described in the above Japanese laid-open patent can be easily converted in accordance with the change in screen size and various kinds of data can be displayed in accordance with necessity. It is naturally desirable to correct a parallax caused by a change in photographing distance.

SUMMARY OF THE INVENTION

It is therefore a first object of the present invention to provide a real image type zoom finder optical system having a zoom ratio of about three times, a preferable optical performance and a simplified construction.

A second object of the present invention is to provide a real image type zoom finder optical system in which the frame of a visual field of a finder, etc. can be easily converted and parallax can be corrected and various kinds of data can be displayed within the visual field of a finder in accordance with necessity.

In accordance with a first construction of the present invention, the above objects can be achieved by a real image type zoom finder optical system comprising:

an objective optical system including:
a first lens group having positive refracting power;
a second lens group having negative refracting power;
a third lens group having positive refracting power; and
a fourth lens group having positive refracting power;
the first to fourth lens groups being sequentially arranged from an object side;
the objective optical system having positive refracting power as a whole;
an erect orthoscopic image optical system arranged after the objective optical system; and
an eyepiece optical system having positive refracting power and arranged after the erect orthoscopic image optical system;

the real image type zoom finder optical system being constructed such that each of the four lens groups is constructed by a single lens and a real image formed by the objective optical system is focused and formed within the erect orthoscopic image optical system;

at least one optical face of the second lens group is constructed by an aspherical surface;

a zooming operation is performed from a wide angle end to a telescopic end by moving the second lens group from the object side to an eyepiece side on an optical axis of the real image type zoom finder optical system; and a change in diopter of a finder caused by the zooming operation at this time is corrected by an axial movement of the fourth lens group.

In accordance with a second construction of the present invention, the eyepiece optical system is constructed by two single lenses.

In accordance with a third construction of the present invention, a liquid crystal visual field display member of a transmission type is arranged in a position within the erect orthoscopic image optical system.

In accordance with a fourth construction of the present invention, the above objects can be also achieved by a real image type zoom finder optical system comprising:

an objective optical system including:

a first lens group having positive refracting power;

a second lens group having negative refracting power and constructed by a single lens using an aspherical surface as at least one optical face;

a third lens group having positive refracting power; and a fourth lens group having positive refracting power;

the first to fourth lens groups being sequentially arranged from an object side;

the objective optical system having positive refracting power as a whole;

an erect-orthoscopic image optical system arranged after the objective optical system; and an eyepiece optical system having positive refracting power and arranged after the erect orthoscopic image optical system;

the real image type zoom finder optical system being constructed such that a real image formed by the objective optical system is focused and formed within the erect orthoscopic image optical system;

a zooming operation is performed from a wide angle end to a telescopic end by moving the second lens group from the object side to an eyepiece side on an optical axis of the real image type zoom finder optical system;

a change in diopter of a finder caused by the zooming operation at this time is corrected by an axial movement of the fourth lens group; and the following conditional expression $$1.25 \leq |f_W/f_2| \leq 1.45$$

is satisfied when $f_W$ is a focal length of the objective optical system at the wide angle end and $f_2$ is a focal length of the second lens group.

In accordance with a fifth construction of the present invention, the aspherical surface used as at least one optical face of the second lens group satisfies the following conditional expression $$0.044 < \Delta X(0.5|f_2|)/|f_2| < 0.06$$

$$\Delta X(H) = \frac{C \cdot H^2}{1 + \sqrt{1-(1+K)C^2 \cdot H^2}} + A4 \cdot H^4 + A6 \cdot H^6 + A8 \cdot H^8 + A10 \cdot H^{10} - \frac{C \cdot H^2}{1 + \sqrt{1 - C^2 \cdot H^2}}$$

where $f_2$ is the focal length of the second lens group,

C is an inverse number of a paraxial curvature radius,

H is a height from the optical axis,

K is a conical constant, and

A4, A6, A8 and A10 are respectively aspherical coefficients of fourth, sixth, eighth and tenth orders.

In accordance with a sixth construction of the present invention, the eyepiece optical system is constructed by a positive single lens and a negative single lens and satisfies the following conditional expression $$\nu_{dconcave} < \nu_{dconvex}$$

where $\nu_{dconcave}$ is an Abbe's number of the negative single lens constituting the eyepiece optical system and $\nu_{dconvex}$ is an Abbe's number of the positive single lens constituting the eyepiece optical system.

The above real image type zoom finder optical system has a high zoom ratio such as about three times and a preferable optical performance. No entire length of the real image type zoom finder optical system is changed in the zooming operation. When such a real image type zoom finder optical system is realized, the real image type zoom finder optical system is constructed by the objective optical system composed of four lens groups, and the erect orthoscopic image optical system composed of two erect prisms, and the eyepiece optical system composed of one lens group. The objective optical system, the erect orthoscopic image optical system and the eyepiece optical system are sequentially arranged from the object side. The zooming operation from the wide angle end to the telescopic end is performed by moving the second lens group from the object side to the eyepiece side on the optical axis of the real image type zoom finder optical system. A change in diopter of the finder caused by the zooming operation at this time is corrected by the axial movement of the fourth lens group.

In this case, the second lens group of the objective optical system in the above general technique is constructed by two lenses and each of the other lens groups in the general technique is constructed by a single lens. In contrast to this, in the present invention, the second lens group is also constructed by a single lens and an aspherical surface is used as at least one optical face of the second lens group. Thus, the present invention provides an optical performance equal or excellent in comparison with the general technique. In the general technique, the eyepiece optical system is constructed by a single lens. In contrast to this, in the present invention, the eyepiece optical system is constructed by two lenses sequentially having negative and positive refractive indices so that chromatic aberration of a finder image observed through the eyepiece optical system can be preferably corrected.

Further, the liquid crystal visual field display member of a transmission type is arranged in a position within the erect orthoscopic image optical system. Accordingly, a visual field frame of the finder can be converted and corrected when a screen size is changed and a parallax is corrected. Further, various kinds of data can be displayed within a visual field of the finder.

BRIEF DESCRIPTION OF THE DRAWINGS

FIG. 15 is an aberrational diagram showing distortional aberration at the telescopic end of the real image type zoom finder optical system in the first embodiment of the present invention;

FIG. 16 is an aberrational diagram showing spherical aberration and a sine condition at a wide angle end of a real image type zoom finder optical system in a second embodiment of the present invention;

FIG. 17 is an aberrational diagram showing astigmatism at the wide angle end of the real image type zoom finder optical system in the second embodiment of the present invention;

FIG. 18 is an aberrational diagram showing distortional aberration at the wide angle end of the real image type zoom finder optical system in the second embodiment of the present invention;

FIG. 19 is an aberrational diagram showing spherical aberration and a sine condition at an intermediate focal length of the real image type zoom finder optical system in the second embodiment of the present invention;

FIG. 20 is an aberrational diagram showing astigmatism at the intermediate focal length of the real image type zoom finder optical system in the second embodiment of the present invention;

FIG. 21 is an aberrational diagram showing distortional aberration at the intermediate focal length of the real image type zoom finder optical system in the second embodiment of the present invention;

FIG. 22 is an aberrational diagram showing spherical aberration and a sine condition at a telescopic end of the real image type zoom finder optical system in the second embodiment of the present invention;

FIG. 23 is an aberrational diagram showing astigmatism at the telescopic end of the real image type zoom finder optical system in the second embodiment of the present invention;

FIG. 24 is an aberrational diagram showing distortional aberration at the telescopic end of the real image type zoom finder optical system in the second embodiment of the present invention;

FIG. 25 is an aberrational diagram showing spherical aberration and a sine condition at a wide angle end of a real image type zoom finder optical system in a third embodiment of the present invention;

FIG. 26 is an aberrational diagram showing astigmatism at the wide angle end of the real image type zoom finder optical system in the third embodiment of the present invention;

FIG. 27 is an aberrational diagram showing distortional aberration at the wide angle end of the real image type zoom finder optical system in the third embodiment of the present invention;

FIG. 28 is an aberrational diagram showing spherical aberration and a sine condition at an intermediate focal length of the real image type zoom finder optical system in the third embodiment of the present invention;

FIG. 29 is an aberrational diagram showing astigmatism at the intermediate focal length of the real image type zoom finder optical system in the third embodiment of the present invention;

FIG. 30 is an aberrational diagram showing distortional aberration at the intermediate focal length of the real image type zoom finder optical system in the third embodiment of the present invention;

FIG. 31 is an aberrational diagram showing spherical aberration and a sine condition at a telescopic end of the real image type zoom finder optical system in the third embodiment of the present invention;

FIG. 32 is an aberrational diagram showing astigmatism at the telescopic end of the real image type zoom finder optical system in the third embodiment of the present invention;

FIG. 33 is an aberrational diagram showing distortional aberration at the telescopic end of the real image type zoom finder optical system in the third embodiment of the present invention;

FIG. 34 is an aberrational diagram showing spherical aberration and a sine condition at a wide angle end of a real image type zoom finder optical system in a fourth embodiment of the present invention;

FIG. 35 is an aberrational diagram showing astigmatism at the wide angle end of the real image type zoom finder optical system in the fourth embodiment of the present invention;

FIG. 36 is an aberrational diagram showing distortional aberration at the wide angle end of the real image type zoom finder optical system in the fourth embodiment of the present invention;

FIG. 37 is an aberrational diagram showing spherical aberration and a sine condition at an intermediate focal length of the real image type zoom finder optical system in the fourth embodiment of the present invention;.

FIG. 38 is an aberrational diagram showing astigmatism at the intermediate focal length of the real image type zoom finder optical system in the fourth embodiment of the present invention;

DESCRIPTION OF THE PREFERRED EMBODIMENTS

Figure 1A:
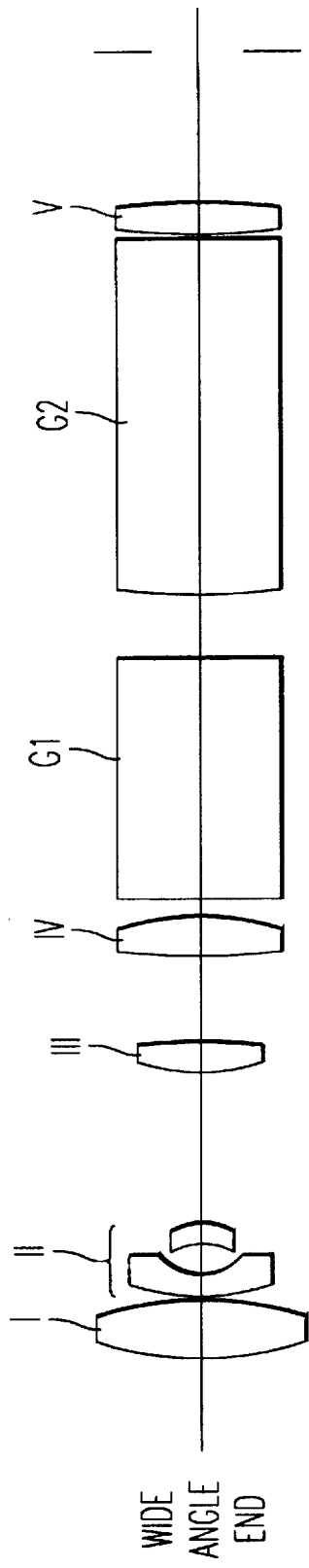
FIGS. 1a and 1b are views showing the construction of an optical system of a general real image type zoom finder.
Figure 1B:
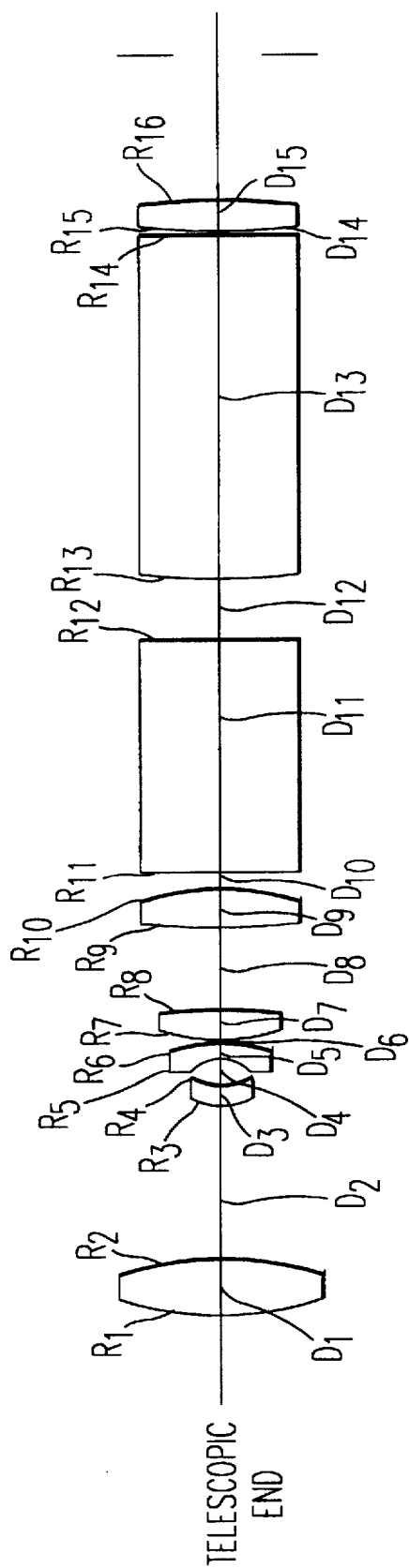

The preferred embodiments of a real image type zoom finder optical system in the present invention will next be described in detail with reference to the accompanying drawings.

A construction and an operation of the real image type zoom finder optical system in the present invention will next be described on the basis of plural embodiments illustrated in the drawings. Symbols $\omega$, $r_i$, $d_i$, $n_i$ and $v_i$ used in the following explanation respectively show the following contents.

Figure 3:
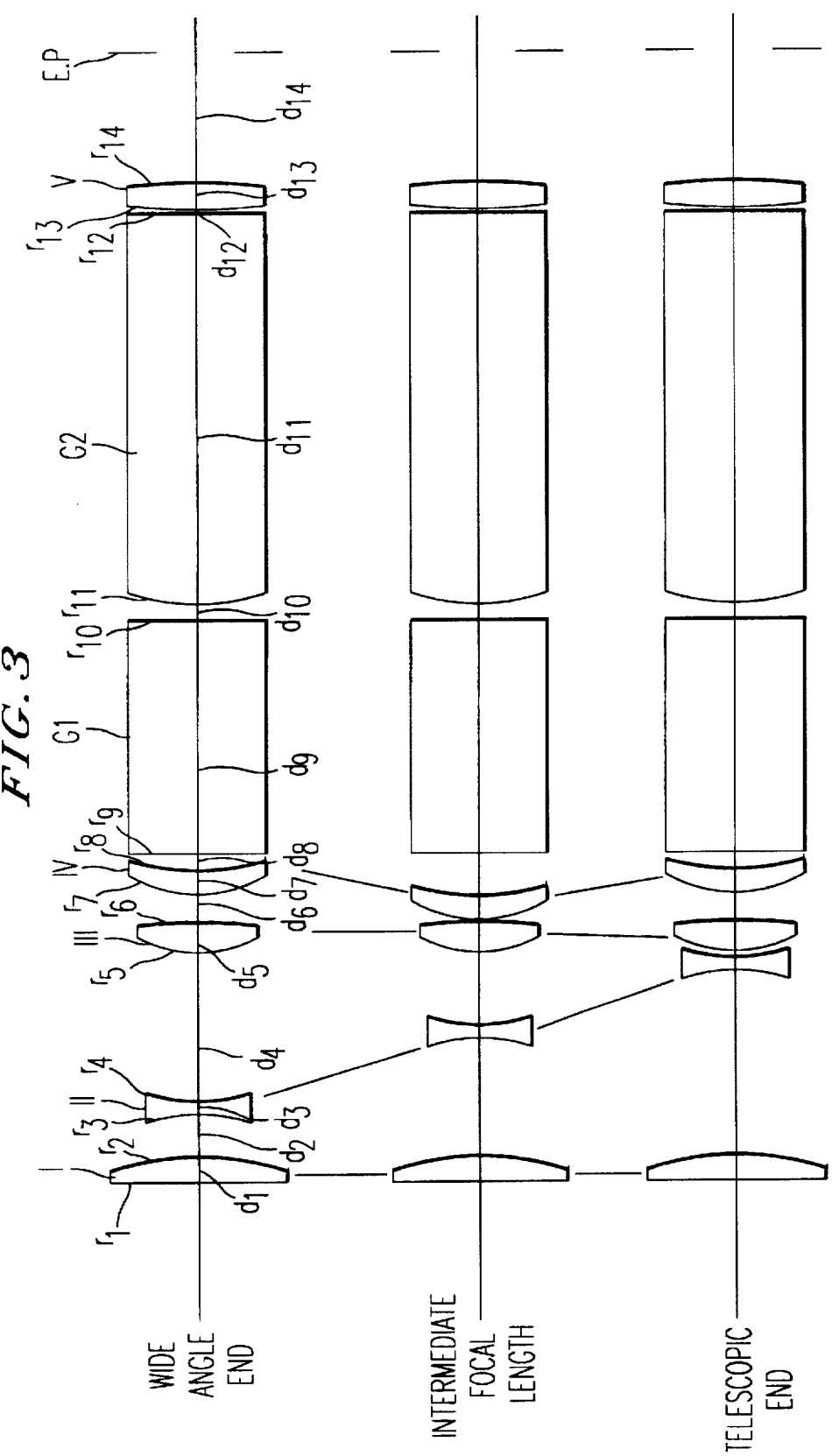
FIG. 3 is a view showing the arrangement of a real image type zoom finder optical system in accordance with a first embodiment of the present invention in which an uppermost view shows an arrangement of respective lens groups at a wide angle end (short focal length end), a middle view shows an arrangement of the respective lens groups at an intermediate focal length, and a lowermost view shows an arrangement of the respective lens groups at a telescopic end (long focal length end)(the same arrangements are used in each of the following optical system arrangement views)
Figure 4:
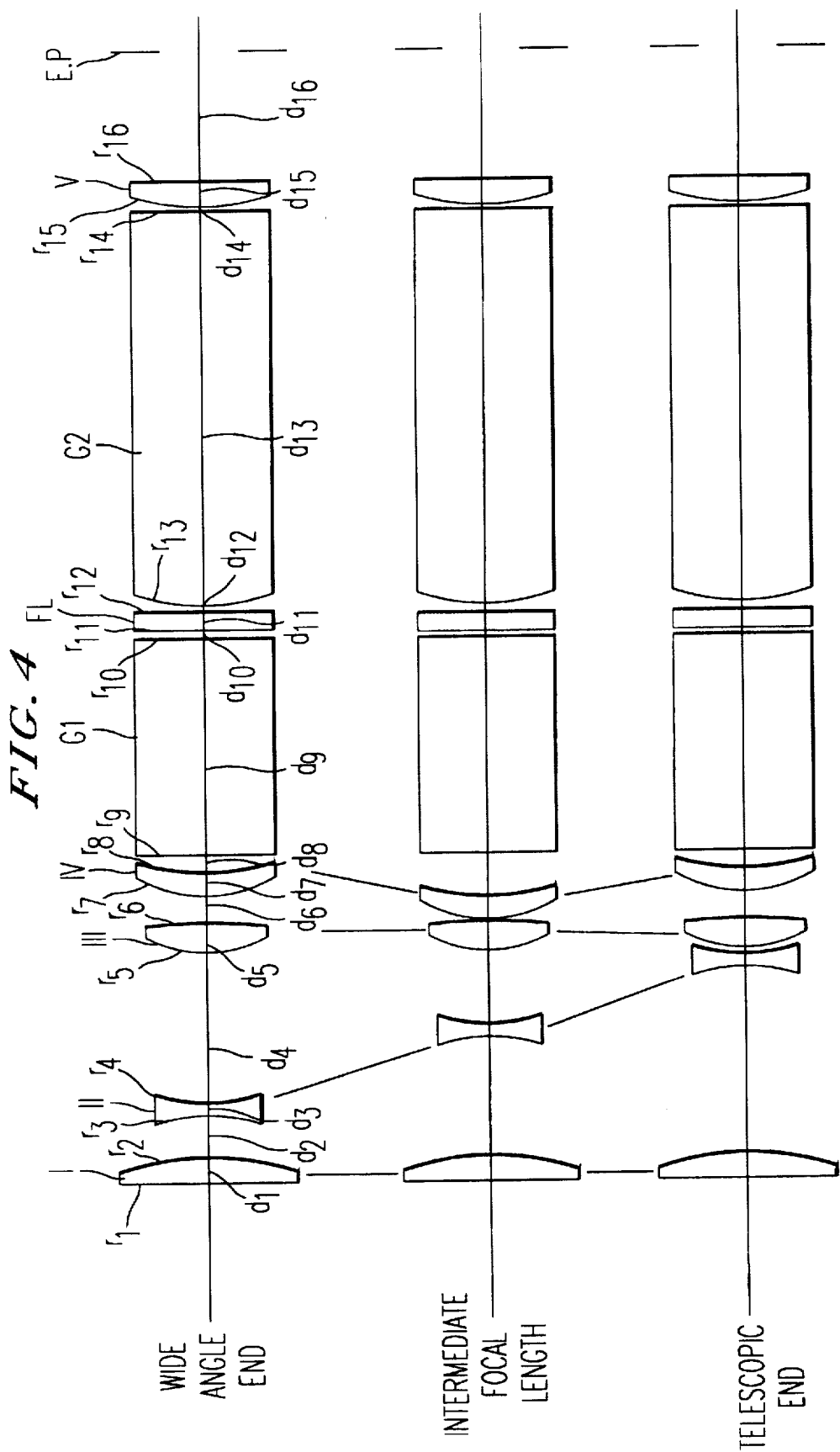
FIG. 4 is a view showing the arrangement of a real image type zoom finder optical system in accordance with a second embodiment of the present invention.
Figure 5:
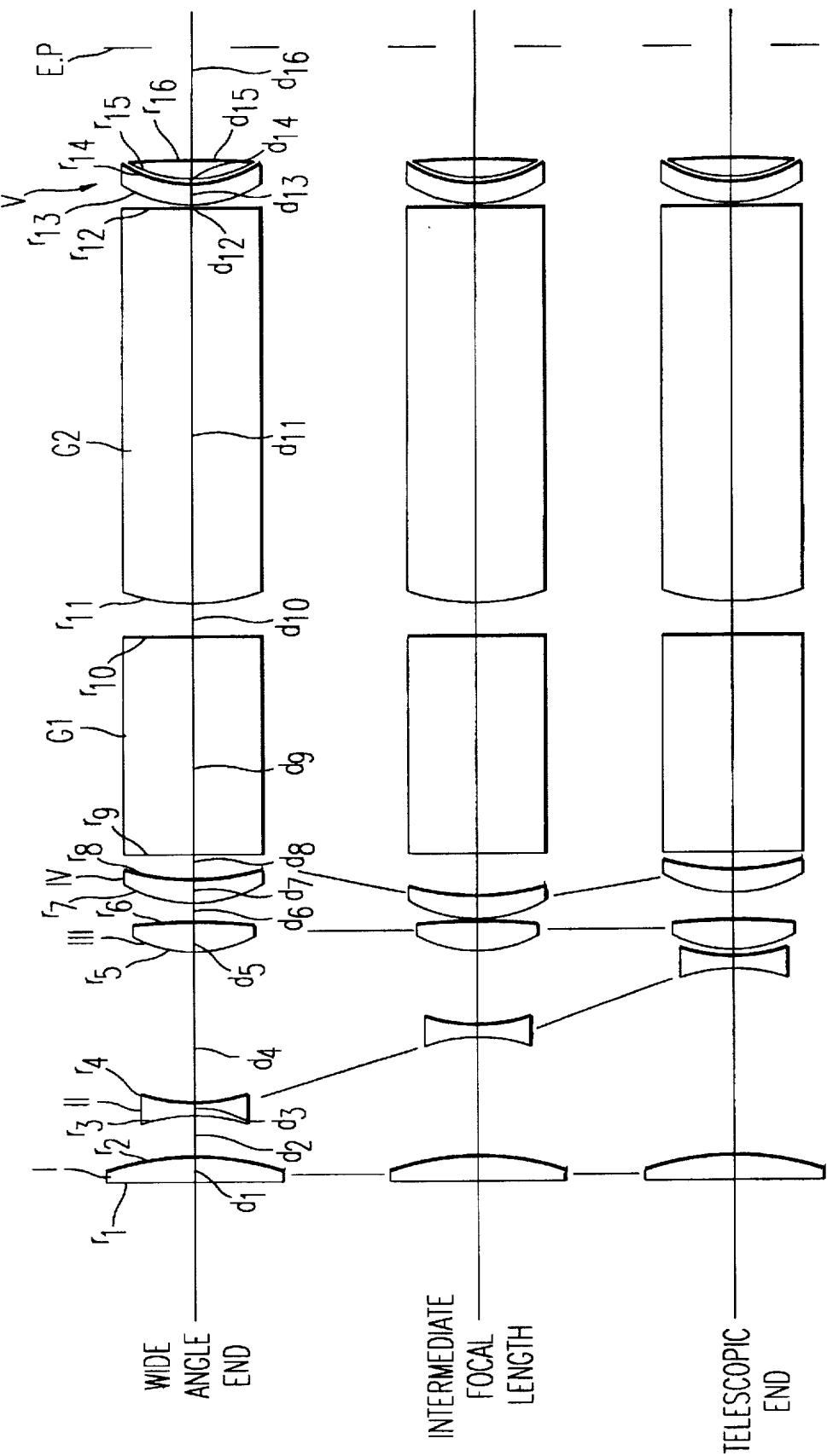
FIG. 5 is a view showing the arrangement of a real image type zoom finder optical system in accordance with a third embodiment of the present invention.
Figure 6:
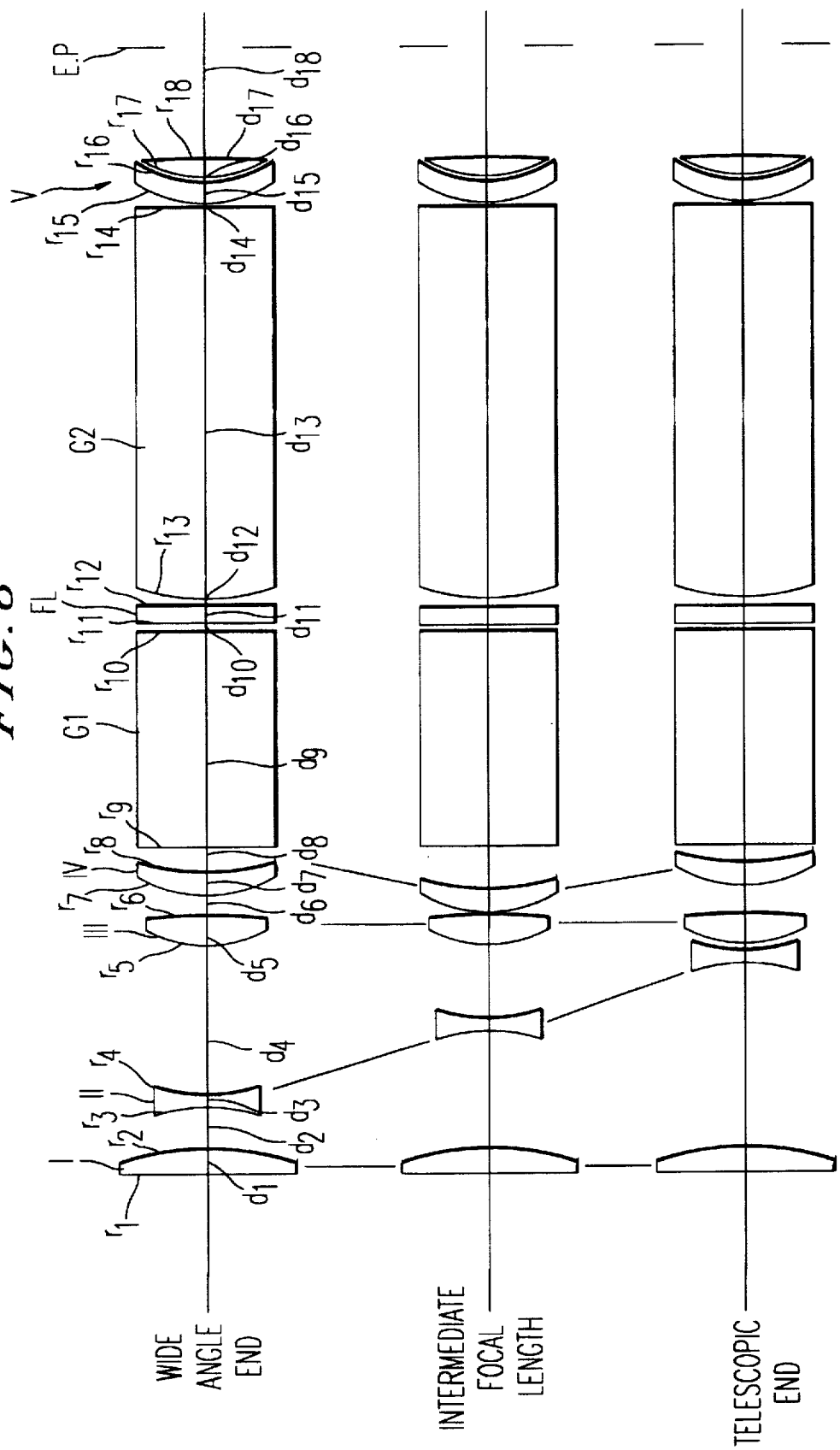
FIG. 6 is a view showing the arrangement of a real image type zoom finder optical system in accordance with a fourth embodiment of the present invention.
Figure 10:
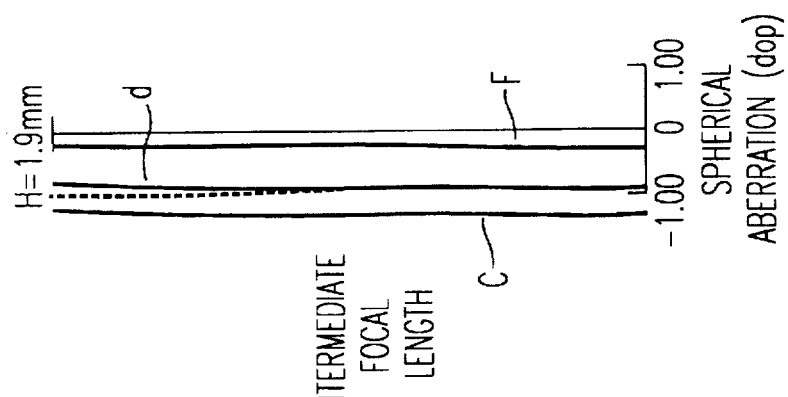
FIG. 10 is an aberrational diagram showing spherical aberration and a sine condition at the intermediate focal length of the real image type zoom finder optical system in the first embodiment of the present invention.
Figure 9:
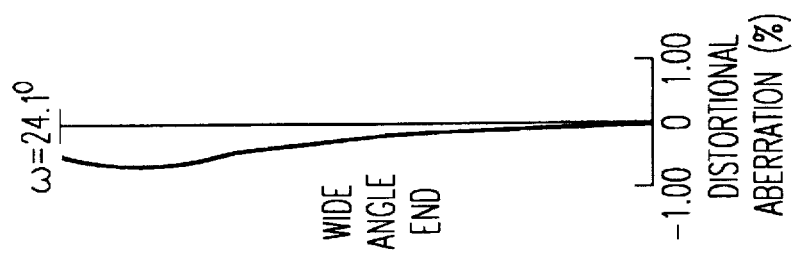
FIG. 9 is an aberrational diagram showing distortional aberration at the wide angle end of the real image type zoom finder optical system in the first embodiment of the present invention.
Figure 8:
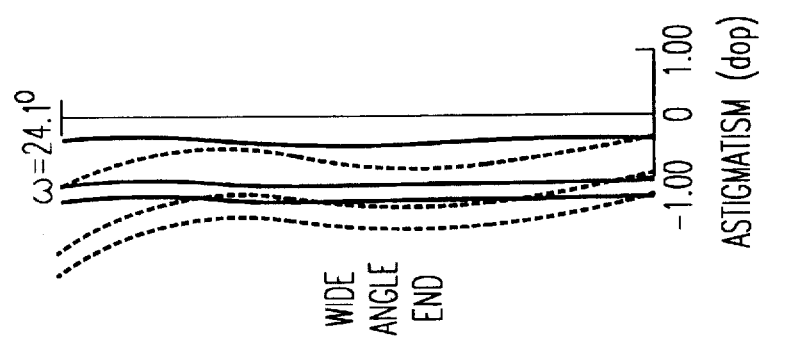
FIG. 8 is an aberrational diagram showing astigmatism at the wide angle end of the real image type zoom finder optical system in the first embodiment of the present invention in which solid lines in FIG. 8 show astigmatism in a sagittal direction at respective wavelengths and broken lines show astigmatism in a meridional direction at the respective wavelengths, and the same solid and broken lines are used in the following corresponding diagrams.
Figure 7:
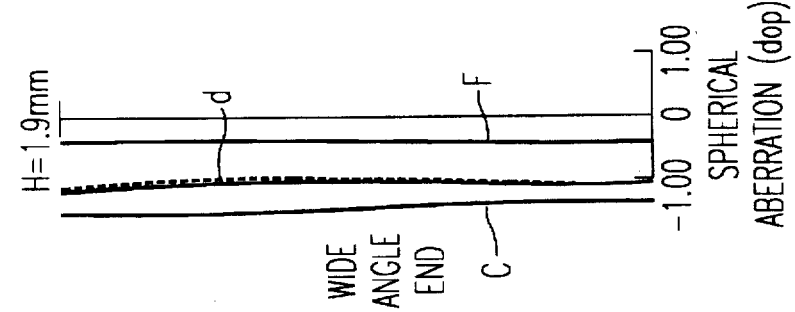
FIG. 7 is an aberrational diagram showing spherical aberration and a sine condition at the wide angle end of the real image type zoom finder optical system in the first embodiment of the present invention in which solid lines "C", "d" and "F" in FIG. 7 show spherical aberrations at respective wavelengths and a broken line shows the sine condition, and the same solid and broken lines are used in the following corresponding diagrams.
Figures 11, 12, 13, 14:
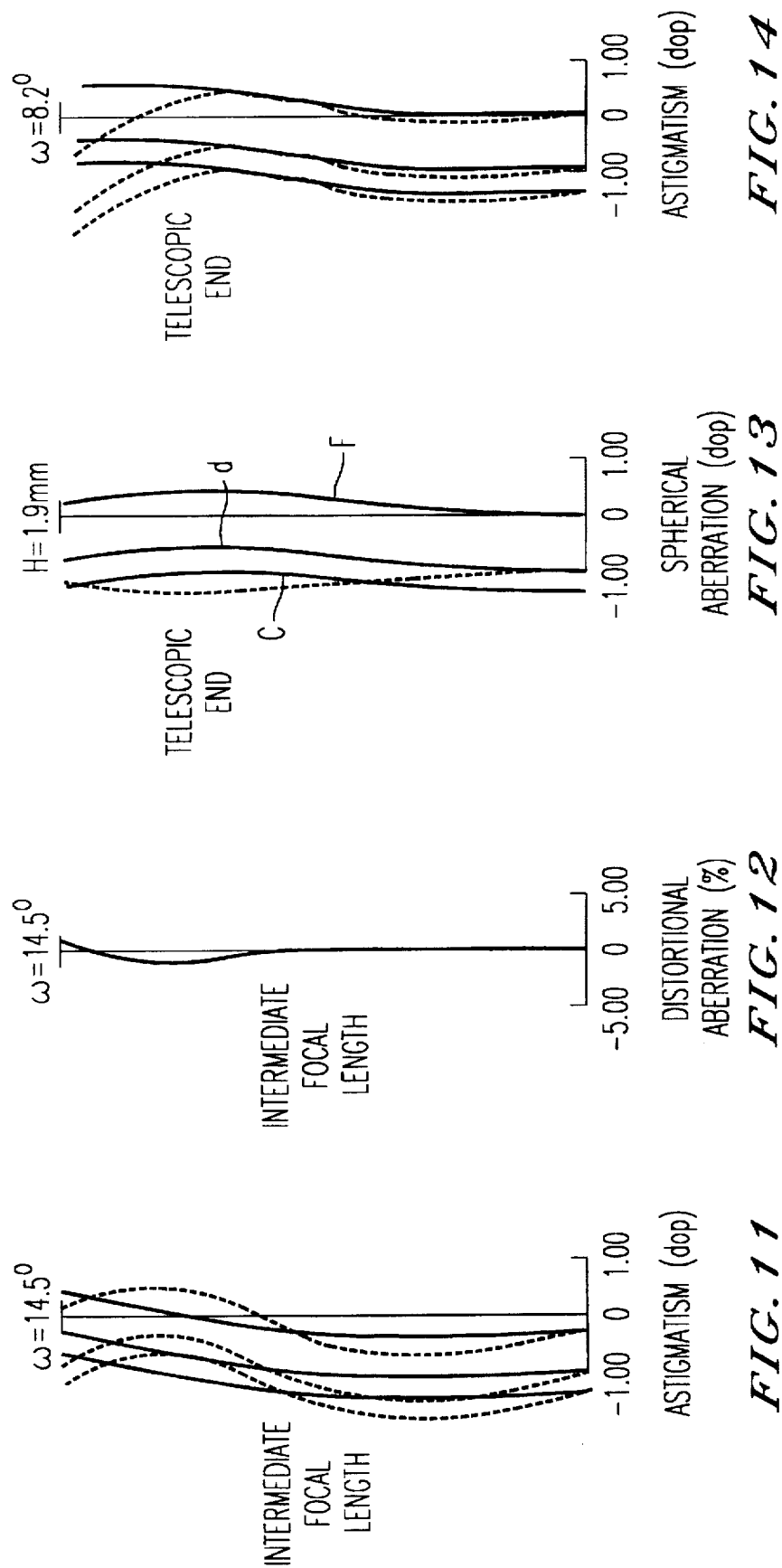
FIG. 11 is an aberrational diagram showing astigmatism at the intermediate focal length of the real image type zoom finder optical system in the first embodiment of the present invention.
FIG. 12 is an aberrational diagram showing distortional aberration at the intermediate focal length of the real image type zoom finder optical system in the: first embodiment of the present invention.
FIG. 13 is an aberrational diagram showing spherical aberration and a sine condition at the telescopic end of the real image type zoom finder optical system in the first embodiment of the present invention.
FIG. 14 is an aberrational diagram showing astigmatism at the telescopic end of the real image type zoom finder optical system in the first embodiment of the present invention.
Figures 39, 40, 41, 42:
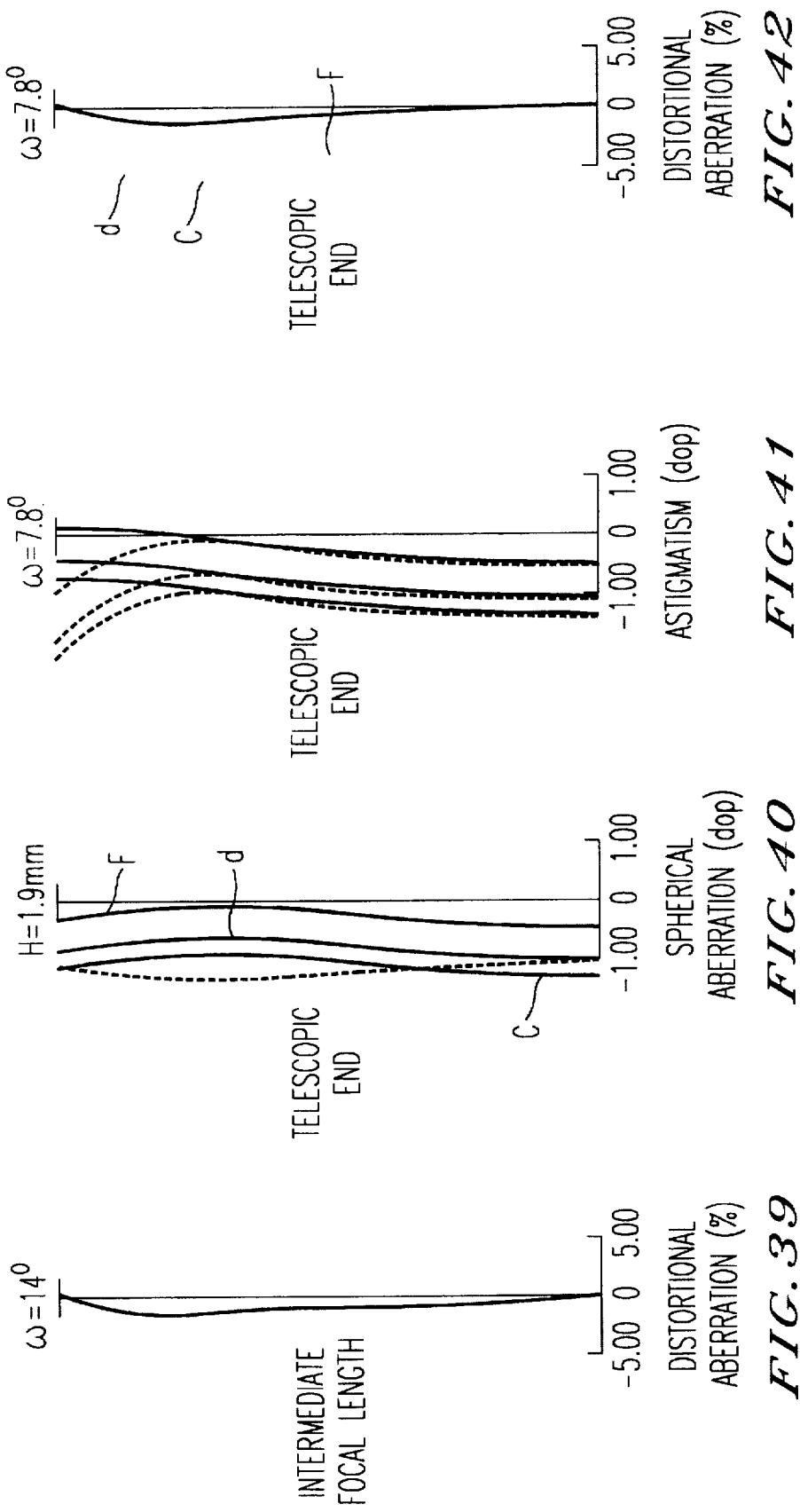
FIG. 39 is an aberrational diagram showing distortional aberration at the intermediate focal length of the real image type zoom finder optical system in the fourth embodiment of the present invention.
FIG. 40 is an aberrational diagram showing spherical aberration and a sine condition at a telescopic end of the real image type zoom finder optical system in the fourth embodiment of the present invention.
FIG. 41 is an aberrational diagram showing astigmatism at the telescopic end of the real image type zoom finder optical system in the fourth embodiment of the present invention.
FIG. 42 is an aberrational diagram showing distortional aberration at the telescopic end of the real image type zoom finder optical system in the fourth embodiment of the present invention.

$\omega$: half field angle $r_i$: curvature radius of an i-th optical face counted from an object side $d_i$: i-th face distance counted from the object side $n_i$: refractive index of an optical material of an i-th lens counted from the object side $v_i$: Abbe's number of the optical material of the i-th lens counted from the object side FIG. 3 is a view showing the arrangement of a real image type zoom finder optical system in accordance with a first embodiment of the present invention. FIG. 4 is a view showing the arrangement of a real image type zoom finder optical system in accordance with a second embodiment of the present invention. FIG. 5 is a view showing the arrangement of a real image type zoom finder optical system in accordance with a third embodiment of the present invention. FIG. 6 is a view showing the arrangement of a real image type zoom finder optical system in accordance with a fourth embodiment of the present invention.

The real image type zoom finder optical system in each of these four embodiments is constructed by a first lens group I, a second lens group II, a third lens group III and a fourth lens group IV sequentially arranged from an object side. The first lens group I has a biconvex shape. The second lens group II has a biconcave shape. The third lens group III has a biconvex shape. The fourth lens group IV has positive refracting power and a meniscus shape in which a convex face is directed onto the object side. The first to fourth lens groups I to IV constitute an objective optical system having positive refracting power as a whole. The real image type zoom finder optical system also has an erect orthoscopic image optical system and an eyepiece optical system V. The erect orthoscopic image optical system is constructed by a first erect prism G1 and a second erect prism G2 arranged after the objective optical system. The eyepiece optical system V has positive refracting power and is arranged after the erect orthoscopic image optical system.

In each of these four embodiments, each of the four lens groups I to IV constituting the objective optical system is constructed by a single lens. A real image formed by this objective optical system is focused and formed as an image within the above erect orthoscopic optical system G1, G2. This image is observed at an eye point E.P through the eyepiece optical system V.

A wide angle end (short focal length end) of this finder optical system is realized when the four lens groups I to IV constituting the objective optical system attain a state shown in an uppermost view of FIG. 3. The second lens group II is axially moved from the object side to an eyepiece side in zooming so that a zooming operation for increasing magnification can be performed from the wide angle end to a telescopic end (long focal length end) through an intermediate focal length. A change in diopter of the finder caused by the zooming operation at this time is corrected by an axial movement of the fourth lens group IV from the uppermost view of FIG. 3 to a lowermost view through an intermediate view.

In this case, the first lens group I and the third lens group III hold rest states while the second lens group II is moved to perform the zooming operation and the fourth lens group IV is moved to correct the change in diopter of the finder.

Figure 2:
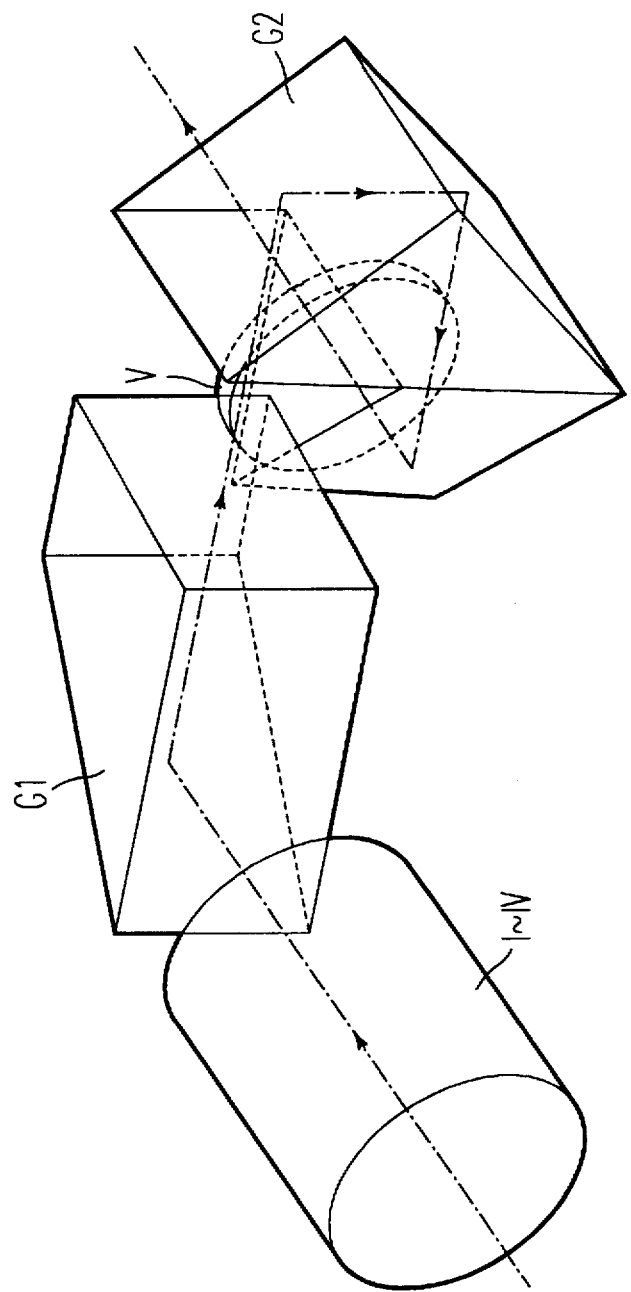
FIG. 2 is a perspective view perspectively showing the real image type zoom finder shown in FIGS. 1a and 1b.

In each of the embodiments, the first erect prism G1 and the second erect prism G2 are constructed as an erect prism system having a structure in which the first erect prism G1 and the second erect prism G2 are combined with each other in a state, for example, as shown in FIG. 2. However, for brevity, each of the first and second erect prisms is illustrated as an optical block in each of FIGS. 3 to 6.

In the real image type zoom finder optical system of the present invention having such a basic construction, the range of refracting power of the second lens group II is set to satisfy the following conditional expression (1) so as to secure a desirable zoom ratio such as about 0.37 times to about 1.24 times while the entire finder optical system is made compact.

$$1.25 \leq |f_w/f_2| \leq 1.45 \tag{1}$$

In this conditional expression, $f_w$ is a focal length of the objective optical system of the lens groups I to IV at the wide angle end.

$f_2$ is a focal length of the second lens group II.

In this case, when the refracting power of the second lens group II is increased and greater than an upper limit value of the conditional expression (1), aberrations are greatly varied by the zooming operation so that it is difficult to construct the second lens group II by a single lens.

In contrast to this, when the refracting power of the second lens group II is decreased and smaller than a lower limit value of the conditional expression (1), a moving amount of the second lens group II is increased by the zooming operation so that no length of a front portion in an erect portion of the objective optical system of the lens groups I to IV can be maintained to be short.

In the real image type zoom finder optical system of the present invention, at least one optical face of the second lens group II, i.e., a front optical face $r_3$ of the second lens group II in each of the embodiments is formed as an aspherical surface. In the following description, this front optical face is called a front face.

In the present invention, it is necessary to set a shape of the aspherical surface $r_3$ in a range satisfying the following conditional expression (2) so as to restrain aberrations and obtain a preferable image.

$$0.044 < \Delta X(0.5|f_2|)/|f_2| < 0.06 \tag{2}$$

$$\Delta X(H) = \frac{C \cdot H^2}{1 + \sqrt{1 - (1+K)C^2 \cdot H^2}} + \tag{2'}$$

$$A4 \cdot H^4 + A6 \cdot H^6 + A8 \cdot H^8 + A10 \cdot H^{10} -$$

$$\frac{CH^2}{1 + \sqrt{1 - C^2 \cdot H^2}}$$

In this conditional expression, $f_2$ is a focal length of the second lens group II.

C is an inverse number (central curvature) of a paraxial curvature radius.

H is a height from an optical axis of the finder optical system.

K is a conical constant.

A4, A6, A8 and A10 are respectively aspherical coefficients of fourth, sixth, eighth and tenth orders.

The shape of the aspherical surface $r_3$ is set within this range in the real image type zoom finder optical system of the present invention.

In this case, when the shape of the aspherical surface $r_3$ exceeds upper and lower limit values of the conditional expression (2), it is difficult to correct distortional aberration and astigmatism on a wide angle side and it is also difficult to correct spherical aberration on a telescopic side.

A detailed construction of the real image type zoom finder optical system in each of the first and second embodiments will next be explained.

The real image type zoom finder optical system in the first embodiment is characterized in that the eyepiece optical system V is constructed by only a biconvex single lens. This real image type zoom finder optical system in the first embodiment has detailed data (parameters) shown in Tables 1 to 3 described later.

In this case, for example, a visual field frame having a normal structure in the first embodiment is arranged on an optical path of an axial distance $d_{10}$ between the first erect prism G1 and the second erect prism G2 although this arrangement is not illustrated.

As mentioned above, the objective optical system of the lens groups I to IV and the erect orthoscopic image optical system of the prisms G1 and G2 used in the first embodiment are commonly provided in each of the embodiments. Accordingly, an explanation of detailed constructions of the objective optical system and the erect orthoscopic image optical system is omitted in the following description. This explanation will be similarly omitted in each of the second to fourth embodiments.

First embodiment $\omega=8.2-24.1°, |f_w/f_2|=1.35, \Delta X(0.5|f_2|)/|f_2|=0.049$

TABLE 1

| | | | | | | | |
|---|---|---|---|---|---|---|---|
| $r_1$ | 398.09 | $d_1$ | 2.12 | $n_1$ | 1.492 | $v_1$ | 58.0 |
| $r_2$ | *−10.85 | $d_2$ | variable | | | | |
| $r_3$ | *−5.78 | $d_3$ | 1.2 | $n_2$ | 1.492 | $v_2$ | 58.0 |
| $r_4$ | 8.09 | $d_4$ | variable | | | | |
| $r_5$ | 9.09 | $d_5$ | 2.61 | $n_3$ | 1.492 | $v_3$ | 58.0 |
| $r_6$ | −22.64 | $d_6$ | variable | | | | |
| $r_7$ | 8.38 | $d_7$ | 1.7 | $n_4$ | 1.492 | $v_4$ | 58.0 |
| $r_8$ | *34.21 | $d_8$ | variable | | | | |
| $r_9$ | plane | $d_9$ | 16.4 | $n_5$ | 1.526 | $v_5$ | 52.0 |
| $r_{10}$ | plane | $d_{10}$ | 0.95 | | | | |
| $r_{11}$ | *9.73 | $d_{11}$ | 35.0 | $n_6$ | 1.492 | $v_6$ | 58.0 |
| $r_{12}$ | plane | $d_{12}$ | 0.3 | | | | |
| $r_{13}$ | *13.42 | $d_{13}$ | 2.0 | $n_7$ | 1.492 | $v_7$ | 58.0 |
| $r_{14}$ | −125.81 | $d_{14}$ | 13.4 | | | | |
| E.P | eye point | | | | | | |

TABLE 2

| aspherical surface | K | A4 | A6 | A8 | A10 |
|---|---|---|---|---|---|
| $r_2$ | −1.491 | 3.4 E-6 | 1.42 E-5 | −4.27 E-7 | 4.42 E-9 |
| $r_3$ | −7.412 | −2.01 E-3 | 2.54 E-4 | −1.1 E-5 | 1.93 E-7 |
| $r_8$ | 49.517 | 1.04 E-3 | −5.04 E-5 | 3.06 E-6 | −6.83 E-8 |
| $r_{11}$ | −72.338 | 1.44 E-3 | −1.03 E-4 | 3.3 E-6 | −2.83 E-8 |
| $r_{13}$ | −1.85 | −1.78 E-5 | 2.03 E-6 | −9.45 E-8 | 1.08 E-9 |

TABLE 3

| magnification | 0.37 | 0.67 | 1.2 |
|---|---|---|---|
| $d_2$ | 2.52 | 6.57 | 10.78 |
| $d_4$ | 8.76 | 4.71 | 0.5 |
| $d_6$ | 1.92 | 0.3 | 1.92 |
| $d_8$ | 1.18 | 2.8 | 1.18 |

Similar to the first embodiment, the eyepiece optical system V is constructed by only a biconvex single lens in the real image type zoom finder optical system in the second embodiment. Further, the real image type zoom finder optical system in the second embodiment is characterized in that a liquid crystal visual field display member FL of a transmission type is arranged on the optical path of an axial distance $d_{10}$ between the first erect prism G1 and the second erect prism G2 in the first embodiment. This real image type zoom finder optical system in the second embodiment has detailed data shown in Tables 4 to 6.

Second embodiment

ω=8.2–24.1°, |$f_w f_2$|=1.34, Δ$X(0.5|f_2|)/|f_2|$=0.055

TABLE 4

| | | | | | | | |
|---|---|---|---|---|---|---|---|
| $r_1$ | 1653.65 | $d_1$ | 1.99 | $n_1$ | 1.492 | $v_1$ | 58.0 |
| $r_2$ | *–10.7 | $d_2$ | variable | | | | |
| $r_3$ | *–5.9 | $d_3$ | 1.2 | $n_2$ | 1.492 | $v_2$ | 58.0 |
| $r_4$ | 8.13 | $d_4$ | variable | | | | |
| $r_5$ | 8.97 | $d_5$ | 2.63 | $n_3$ | 1.492 | $v_3$ | 58.0 |
| $r_6$ | –22.82 | $d_6$ | variable | | | | |
| $r_7$ | 8.51 | $d_7$ | 1.67 | $n_4$ | 1.492 | $v_4$ | 58.0 |
| $r_8$ | *31.83 | $d_8$ | variable | | | | |
| $r_9$ | plane | $d_9$ | 16.4 | $n_5$ | 1.585 | $v_5$ | 29.0 |
| $r_{10}$ | plane | $d_{10}$ | 0.5 | | | | |
| $r_{11}$ | plane | $d_{11}$ | 1.4 | $n_6$ | 1.517 | $v_6$ | 64.2 |
| $r_{12}$ | plane | $d_{12}$ | 0.43 | | | | |
| $r_{13}$ | *9.83 | $d_{13}$ | 34.2 | $n_7$ | 1.492 | $v_7$ | 58.0 |
| $r_{14}$ | plane | $d_{14}$ | 0.3 | | | | |
| $r_{15}$ | *13.43 | $d_{15}$ | 2.0 | $n_8$ | 1.492 | $v_8$ | 58.0 |
| $r_{16}$ | –124.39 | $d_{16}$ | 13.8 | | | | |
| E.P | eye point | | | | | | |

TABLE 5

| aspherical surface | K | A4 | A6 | A8 | A10 |
|---|---|---|---|---|---|
| $r_2$ | –1.515 | 2.15 E-5 | 1.25 E-5 | –3.47 E-7 | 2.28 E-9 |
| $r_3$ | –8.685 | –2.45 E-3 | 3.11 E-4 | –1.49 E-5 | 2.91 E-7 |
| $r_8$ | 40.52 | 1.02 E-3 | –4.76 E-5 | 2.85 E-6 | –6.01 E-8 |
| $r_{13}$ | –43.409 | 9.43 E-4 | –1.1 E-4 | 5.73 E-6 | –9.4 E-8 |
| $r_{15}$ | –1.903 | –1.07 E-5 | 1.04 E-6 | –3.09 E-8 | –6.11 E-11 |

TABLE 6

| magnification | 0.38 | 0.69 | 1.24 |
|---|---|---|---|
| $d_2$ | 2.4 | 6.49 | 10.78 |
| $d_4$ | 8.88 | 4.79 | 0.5 |
| $d_6$ | 2.04 | 0.38 | 2.06 |
| $d_8$ | 1.27 | 2.93 | 1.25 |

In each of the first and second embodiments, a rear optical face (called a rear face in the following description) $r_2$ of the first lens group I, a rear face $r_8$ of the fourth lens group IV, a front face $r_{11}$ ($r_{13}$ in the second embodiment) of the second erect prism G2, and a front face $r_{13}$ ($r_{15}$ in the second embodiment) of the eyepiece optical system V are respectively formed as aspherical surfaces in addition to the above front face $r_3$ of the second lens group II. Shapes of these aspherical surfaces are formed such that the above-mentioned aspherical formula (2') is satisfied.

In the above real image type zoom finder optical system constructed in the first embodiment, each of spherical aberration, astigmatism and distortional aberration is corrected preferably and sufficiently at the wide angle end, the intermediate focal length and the telescopic end as shown in the aberrational diagram of each of FIGS. 7 to 15. In the above real image type zoom finder optical system constructed in the second embodiment, each of spherical aberration, astigmatism and distortional aberration is corrected preferably and sufficiently at the wide angle end, the intermediate focal length and the telescopic end as shown in the aberrational diagram of each of FIGS. 16 to 24.

The real image type zoom finder optical system in each of the first and second embodiments has an excellent image forming performance. However, the eyepiece optical system V is constructed by a single lens. Therefore, chromatic aberration (especially, chromatic aberration on the optical axis) must be corrected by the objective optical system of the lens groups I to IV and the erect orthoscopic image optical system of the prisms G1 and G2. As a result, when a finder image is observed through the eyepiece optical system V, it is considered that there is a fear of leaving slight chromatic aberration on the optical axis which cannot be completely corrected by the objective optical system of the lens groups I to IV and the erect orthoscopic image optical system of the prisms G1 and G2.

Therefore, in the real image type zoom finder optical system in each of the third and fourth embodiments, the eyepiece optical system V is constructed such that the axial chromatic aberration can be preferably corrected in the observation of the finder image through the eyepiece optical system V. Namely, the eyepiece optical system V is constructed by a lens having a meniscus shape and negative refracting power such that a convex face is directed onto an object side. The eyepiece optical system V is also constructed by a biconvex lens arranged after this lens of the meniscus shape. The eyepiece optical system V is constructed by these two lenses.

In this case, Abbe's numbers of the positive and negative lenses constituting the eyepiece optical system V are set to preferably correct the axial chromatic aberration in the eyepiece optical system V such that the following conditional expression (3) is satisfied.

$$v_{dconcave} < v_{dconvex} \quad (3)$$

In this conditional expression, $v_{dconcave}$ shows an Abbe's number of the negative lens constituting the eyepiece optical system V.

$v_{dconvex}$ shows an Abbe's number of the positive (biconvex) lens constituting the eyepiece optical system V.

When no relation of this conditional expression (3) is formed, it is very difficult to preferably correct the axial chromatic aberration in the eyepiece optical system V.

A detailed construction of the real image type zoom finder optical system in each of the third and fourth embodiments will next be explained.

The real image type zoom finder optical system in the third embodiment is characterized in that the eyepiece optical system V constructed by the above two lenses is used instead of the eyepiece optical system V constructed by a single lens in the first embodiment. The real image type zoom finder optical system in the third embodiment has detailed data shown in Tables 7 to 9.

Third embodiment

ω=8.3–24.6°, |$f_w f_2$|=1.365, Δ$(0.5|f_2|)/|f_2|$=0.049

TABLE 7

| | | | | | | | |
|---|---|---|---|---|---|---|---|
| $r_1$ | 143.25 | $d_1$ | 1.97 | $n_1$ | 1.492 | $v_1$ | 58.0 |
| $r_2$ | *–11.37 | $d_2$ | variable | | | | |
| $r_3$ | *–5.938 | $d_3$ | 1.2 | $n_2$ | 1.492 | $v_2$ | 58.0 |
| $r_4$ | 8.154 | $d_4$ | variable | | | | |
| $r_5$ | 9.107 | $d_5$ | 2.44 | $n_3$ | 1.492 | $v_3$ | 58.0 |
| $r_6$ | –21.535 | $d_6$ | variable | | | | |
| $r_7$ | 8.924 | $d_7$ | 1.56 | $n_4$ | 1.492 | $v_4$ | 58.0 |
| $r_8$ | *32.993 | $d_8$ | variable | | | | |
| $r_9$ | plane | $d_9$ | 16.4 | $n_5$ | 1.526 | $v_5$ | 52.0 |
| $r_{10}$ | plane | $d_{10}$ | 1.4 | | | | |
| $r_{11}$ | *8.979 | $d_{11}$ | 35.0 | $n_6$ | 1.526 | $v_6$ | 52.0 |
| $r_{12}$ | plane | $d_{12}$ | 0.3 | | | | |
| $r_{13}$ | 16.309 | $d_{13}$ | 2.0 | $n_7$ | 1.585 | $v_7$ | 28.0 |
| $r_{14}$ | 12.035 | $d_{14}$ | 0.5 | | | | |
| $r_{15}$ | *11.106 | $d_{15}$ | 1.2 | $n_8$ | 1.492 | $v_8$ | 58.0 |
| $r_{16}$ | –64.988 | $d_{16}$ | 13.0 | | | | |
| E.P | eye point | | | | | | |

TABLE 8

| aspherical surface | K | A4 | A6 | A8 | A10 |
|---|---|---|---|---|---|
| $r_2$ | −1.457 | 2.38 E-5 | 1.23 E-5 | −4.04 E-7 | 5.35 E-9 |
| $r_3$ | −9.075 | −2.49 E-3 | 3.01 E-4 | −1.46 E-5 | 3.07 E-7 |
| $r_8$ | 44.55 | 1.01 E-3 | −4.93 E-5 | 2.84 E-6 | −5.78 E-8 |
| $r_{11}$ | −50.918 | 1.45 E-3 | −1.2 E-4 | 4.97 E-6 | −7.02 E-8 |
| $r_{15}$ | −1.368 | 1.86 E-5 | 7.52 E-7 | −4.16 E-8 | 1.46 E-9 |

TABLE 9

| magnification | 0.38 | 0.68 | 1.23 |
|---|---|---|---|
| $d_2$ | 2.35 | 6.44 | 10.77 |
| $d_4$ | 8.92 | 4.83 | 0.5 |
| $d_6$ | 1.93 | 0.3 | 2.46 |
| $d_8$ | 1.64 | 3.27 | 1.11 |

The real image type zoom finder optical system in the fourth embodiment uses the eyepiece optical system V constructed by two lenses. Similar to the second embodiment, the real image type zoom finder optical system in the fourth embodiment is further characterized in that a liquid crystal visual field display member FL of a transmission type is arranged on the optical path of an axial distance $d_{10}$ between the first erect prism G1 and the second erect prism G2. This real image type zoom finder optical system in the fourth embodiment has detailed data shown in Tables 10 to 12.

Fourth embodiment $\omega=7.8-24.6°, |f_w/f_2|=1.371, \Delta X(0.5|f_2|)/|f_2|=0.048$

TABLE 10

| $r_1$ | 78.373 | $d_1$ | 2.08 | $n_1$ | 1.492 | $v_1$ | 58.0 |
|---|---|---|---|---|---|---|---|
| $r_2$ | *−12.18 | $d_2$ | variable | | | | |
| $r_3$ | *−5.879 | $d_3$ | 1.2 | $n_2$ | 1.492 | $v_2$ | 58.0 |
| $r_4$ | 8.123 | $d_4$ | variable | | | | |
| $r_5$ | 9.167 | $d_5$ | 2.36 | $n_3$ | 1.492 | $v_3$ | 58.0 |
| $r_6$ | −20.538 | $d_6$ | variable | | | | |
| $r_7$ | 9.039 | $d_7$ | 1.55 | $n_4$ | 1.492 | $v_4$ | 58.0 |
| $r_8$ | *36.232 | $d_8$ | variable | | | | |
| $r_9$ | plane | $d_9$ | 16.4 | $n_5$ | 1.526 | $v_5$ | 52.0 |
| $r_{10}$ | plane | $d_{10}$ | 0.2 | | | | |
| $r_{11}$ | plane | $d_{11}$ | 1.4 | $n_6$ | 1.517 | $v_6$ | 64.0 |
| $r_{12}$ | plane | $d_{12}$ | 0.25 | | | | |
| $r_{13}$ | *9.051 | $d_{13}$ | 35.0 | $n_7$ | 1.492 | $v_7$ | 58.0 |
| $r_{14}$ | plane | $d_{14}$ | 0.3 | | | | |
| $r_{15}$ | 12.363 | $d_{15}$ | 2.0 | $n_8$ | 1.585 | $v_8$ | 28.0 |
| $r_{16}$ | 7.358 | $d_{16}$ | 0.5 | | | | |
| $r_{17}$ | *7.906 | $d_{17}$ | 1.63 | $n_9$ | 1.492 | $v_9$ | 58.0 |
| $r_{18}$ | −63.873 | $r_{18}$ | 13.0 | | | | |
| E.P | eye point | | | | | | |

TABLE 11

| aspherical surface | K | A4 | A6 | A8 | A10 |
|---|---|---|---|---|---|
| $r_2$ | −1.51 | 2.52 E-5 | 1.15 E-5 | −4.45 E-7 | 6.87 E-9 |
| $r_3$ | −8.162 | −2.32 E-3 | 2.9 E-4 | −1.52 E-5 | 3.67 E-7 |
| $r_8$ | 48.79 | 1.05 E-3 | −5.19 E-5 | 3.09 E-6 | −6.03 E-8 |
| $r_{13}$ | −41.338 | 1.41 E-3 | −1.2 E-4 | 4.98 E-6 | −6.97 E-8 |
| $r_{17}$ | −0.658 | 1.1 E-4 | 3.44 E-6 | −1.07 E-7 | 4.64 E-9 |

TABLE 12

| magnification | 0.38 | 0.68 | 1.22 |
|---|---|---|---|
| $d_2$ | 2.49 | 6.55 | 10.84 |
| $d_4$ | 8.85 | 4.79 | 0.5 |
| $d_6$ | 1.88 | 0.3 | 2.41 |
| $d_8$ | 1.58 | 3.16 | 1.05 |

Similar to the first and second embodiments, a rear face $r_2$ of the first lens group I, a rear face $r_8$ of the fourth lens group IV, a front face $r_{11}$ ($r_{13}$ in the fourth embodiment) of the second erect prism G2, and a front face $r_{15}$ ($r_{17}$ in the fourth embodiment) of the biconvex lens near an eye point among the two lenses constituting the eyepiece optical system V are formed as aspherical surfaces in the third and fourth embodiments in addition to the front face $r_3$ of the second lens group II. Similar to the first and second embodiments, shapes of these aspherical surfaces are formed such that the above-mentioned aspherical formula (2') is satisfied.

For example, the liquid crystal visual field display member FL of a transmission type arranged in each of the second and fourth embodiments is constructed by a visual field variable frame in which a screen size can be changed from a normal full size to a panoramic size within a visual field of the finder. The liquid crystal visual field display member FL may be constructed by a parallax correcting frame for correcting a parallax caused by a change in photographing distance. The liquid crystal visual field display member FL may be also constructed by one of these frames or/and a structure capable of displaying various kinds of data at a photographing time although these data are not illustrated.

In this case, the liquid crystal visual field display member FL of a transmission type is operated by a liquid crystal driving circuit and is constructed such that a desirable frame and various kinds of data can be displayed within the finder visual field in accordance with necessity. Each of the liquid crystal visual field display member FL and the liquid crystal driving circuit is constructed by a well-known technique and preferably has a light transmitting performance provided such that no useless aberration is caused with respect to a light beam of the finder progressing within the real image type zoom finder optical system.

In the above real image type zoom finder optical system constructed in the third embodiment, each of spherical aberration, astigmatism and distortional aberration is corrected preferably and sufficiently at the wide angle end, the intermediate focal length and the telescopic end as shown in the aberrational diagram of each of FIGS. 25 to 33. In the above real image type zoom finder optical system constructed in the fourth embodiment, each of spherical aberration, astigmatism and distortional aberration is corrected preferably and sufficiently at the wide angle end, the intermediate focal length and the telescopic end as shown in the aberrational diagram of each of FIGS. 34 to 42.

Each of the aberrational diagrams in the first to fourth embodiments shows an excellent image forming performance of the real image type zoom finder optical system in the present invention. In the above description, the present invention is explained on the basis of the illustrated embodiments. However, the present invention is not limited to these embodiments. The present invention can be embodied in various kinds of modifications without departing the scope of features of the present invention.

As mentioned above, each of all lens groups I to IV of an objective optical system is constructed by a single lens to realize a real image type zoom finder optical system having a high zoom ratio such as about three times and a preferable optical performance in accordance with the present invention. Further, the real image type zoom finder optical system uses a simple zooming mechanism in which the second lens group II is moved to perform a zooming operation and the fourth lens group IV is moved to correct a change in diopter of a finder in a state in which the first lens group I and the fourth lens group IV are held at rest. Accordingly, the construction of the real image type zoom finder optical system can be simplified in comparison with the general real image type zoom finder optical system. Further, it is possible to provide a real image type zoom finder optical system in which the change in diopter of the finder caused by the zooming operation is small and no entire length of the real image type zoom finder optical system is changed.

In this case, an eyepiece optical system V can be also constructed by a single lens. When the eyepiece optical system V is constructed by a single lens in the present invention, the construction of the real image type zoom finder optical system can be further simplified.

Chromatic aberration can be preferably corrected in observation of a finder image through the eyepiece optical system V by constructing the eyepiece optical system V by two lenses. Accordingly, when the eyepiece optical system V is constructed by such two lenses in the present invention, the chromatic aberration can be reduced.

In a third construction of the present invention, a visual field frame of the finder is constructed by a liquid crystal visual field display member FL of a transmission type. Accordingly, the visual field frame of the finder can be converted and corrected when a screen size is changed and a parallax is corrected. Further, various kinds of data can be displayed within the visual field of the finder in accordance with necessity.

Many widely different embodiments of the present invention may be constructed without departing from the spirit and scope of the present invention. It should be understood that the present invention is not limited to the specific embodiments described in the specification, except as defined in the appended claims.

What is claimed is:

1. A real image type zoom finder optical system comprising:

an objective optical system including:

a first lens group having positive refracting power;

a second lens group having negative refracting power and constructed by a single lens using an aspherical surface as at least one optical face, wherein a zooming operation is performed from a wide angle end to a telescopic end by moving said second lens group from the object side to an eyepiece side on an optical axis of the real image type zoom finder optical system;

a third lens group having positive refracting power; and a fourth lens group having positive refracting power wherein a changed in diopter of a finder caused by the zooming operation of said second lens group is corrected by an axial movement of said fourth lens group;

the first to fourth lens groups being sequentially arranged from an object side;

the objective optical system having positive refracting power as a whole;

an erect orthoscopic image optical system arranged after the objective optical system; and an eyepiece optical system having positive refracting power and arranged after the erect orthoscopic image optical system;

the real image type zoom finder optical system being constructed such that a real image formed by said objective optical system is focused and formed within said erect orthoscopic image optical system; and the following conditional expression $$1.25 \leq |f_w/f_2| \leq 1.45$$

is satisfied when $f_w$ is a focal length of said objective optical system at the wide angle end and $f_2$ is a focal length of said second lens group.

2. A real image type zoom finder optical system as claimed in claim 1, wherein the aspherical surface used as at least one optical face of said second lens group satisfies the following conditional expression $$0.044 < \Delta X(0.5|f_2|)/|f_2| < 0.06$$

$$\Delta X(H) = \frac{C \cdot H^2}{1 + \sqrt{1-(1+K)C^2 \cdot H^2}} +$$

$$A4 \cdot H^4 + A6 \cdot H^6 + A8 \cdot H^8 + A10 \cdot H^{10} -$$

$$\frac{C \cdot H^2}{1 + \sqrt{1 - C^2 \cdot H^2}}$$

where $f_2$ is the focal length of said second lens group,

C is an inverse number of a paraxial curvature radius,

H is a height from the optical axis,

K is a conical constant, and

A4, A6, A8 and A10 are respectively aspherical coefficients of fourth, sixth, eighth and tenth orders.

3. A real image type zoom finder optical system as claimed in claim 1, wherein said eyepiece optical system is constructed by a positive single lens and a negative single lens and satisfies the following conditional expression $$V_{dconcave} < V_{dconvex}$$

where $V_{dconcave}$ is an Abbe's number of the negative single lens constituting the eyepiece optical system and $V_{dconvex}$ is an Abbe's number of the positive single lens constituting the eyepiece optical system.

* * * * *